United States Patent
Amin et al.

(10) Patent No.: US 7,810,373 B2
(45) Date of Patent: Oct. 12, 2010

(54) MEMS SHOCK SENSORS

(75) Inventors: Nurul Amin, Woodbury, MN (US); Song S. Xue, Edina, MN (US); Patrick J. Ryan, St. Paul, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 174 days.

(21) Appl. No.: 11/677,762

(22) Filed: Feb. 22, 2007

(65) Prior Publication Data

US 2008/0202258 A1    Aug. 28, 2008

(51) Int. Cl.
*G01P 15/00*    (2006.01)
(52) U.S. Cl. .................................................. 73/12.09
(58) Field of Classification Search ..... 73/12.01–12.09, 73/492
See application file for complete search history.

(56) References Cited

U.S. PATENT DOCUMENTS

| | | | | |
|---|---|---|---|---|
| 2,666,409 | A * | 1/1954 | Kane | 116/203 |
| 4,641,539 | A * | 2/1987 | Vilimek | 73/862.636 |
| 4,683,355 | A * | 7/1987 | Bitko | 200/61.47 |
| 4,862,298 | A * | 8/1989 | Genheimer et al. | 360/60 |
| 5,144,845 | A * | 9/1992 | Pyke | 73/827 |
| 5,747,761 | A * | 5/1998 | Masuda | 200/61.45 R |
| 5,856,895 | A | 1/1999 | Schaenzer et al. | |
| 6,079,088 | A | 6/2000 | Schaenzer | |
| 6,199,874 | B1 * | 3/2001 | Galvin et al. | 280/5.514 |
| 6,318,176 | B1 | 11/2001 | McKenzie et al. | |
| 6,619,123 | B2 * | 9/2003 | Gianchandani et al. | 73/514.29 |
| 6,629,448 | B1 | 10/2003 | Cvancara | |
| 6,938,334 | B2 * | 9/2005 | Yu | 29/830 |
| 6,975,476 | B1 * | 12/2005 | Berding | 360/69 |
| 7,038,150 | B1 * | 5/2006 | Polosky et al. | 200/61.45 R |
| 7,266,988 | B2 * | 9/2007 | Kranz et al. | 73/12.01 |
| 7,289,009 | B1 * | 10/2007 | Christenson et al. | 335/78 |
| 7,350,424 | B2 * | 4/2008 | Hjelt et al. | 73/862.041 |
| 7,404,338 | B2 * | 7/2008 | Hierold et al. | 73/862.68 |
| 7,493,815 | B1 * | 2/2009 | Younis | 73/514.16 |
| 2004/0000713 | A1 | 1/2004 | Yamashita et al. | |
| 2005/0223812 | A1 | 10/2005 | Denis | |
| 2006/0009251 | A1 | 1/2006 | Noda et al. | |

OTHER PUBLICATIONS

Wang et al., "Design, Fabrication, and Measurement of High-Sensitivity Piezoelectric Microelectromechanical Systems Accelerometers," Journal of Microelectromechanical Systems, Aug. 2003, pp. 433-439, vol. 12, No. 4.
U.S. Appl. No. 11/348,930, titled "Magnetic MEMS Device," filed Feb. 7, 2006.

* cited by examiner

*Primary Examiner*—Lisa M Caputo
*Assistant Examiner*—Octavia Davis
(74) *Attorney, Agent, or Firm*—Shumaker & Sieffert, P.A.

(57) ABSTRACT

A shock sensor comprises a substrate and at least one flexure coupled to the substrate and configured to deflect upon an application of force to the shock sensor sufficient to deflect the flexure. Deflection of the at least one flexure produces a detectable change in an electrical property of the shock sensor. Examples of detectable changes in an electrical property of the shock sensor include an open circuit condition, a closed circuit condition, and a variation in voltage of a piezo-electric detector. In some embodiments, the change in the electrical property of the shock sensor may be remotely read by interrogation of a radio frequency identification transponder positioned on the substrate using a remote radio frequency identification transceiver. The disclosure also relates to a shock sensing system and method of shock detection.

24 Claims, 5 Drawing Sheets

MEMS SHOCK SENSORS

TECHNICAL FIELD

The invention relates to electronic sensors, particularly MEMS sensors.

BACKGROUND

Micro-electro-mechanical systems (MEMS) are a class of micron-scale devices, made using semi-conductor processing, that integrate electronic and mechanical device functions on a single integrated circuit. In recent years, MEMS techniques have been developed permitting the uniform fabrication of various microscopic mechanical device structures on a single semi-conductor (e.g. silicon) chip, integrating mechanical functions with electronic signal processing. This integrated fabrication approach offers the potential for substantial reductions in device size and weight, as well as improvements in cost, performance and reliability for MEMS devices.

A variety of MEMS sensors have been fabricated, including seismic activity measurement devices, micro-mirror positioning devices, and accelerometers. For example, MEMS accelerometers are widely used to control air bag deployment in automobiles. MEMS accelerometers use a reference mass (i.e. a proof mass) supported by a movable flexure proximate to a moving body. The motion of the reference mass with respect to the moving body is measured by displacement of the flexure relative to a capacitive detector. The displacement of the flexure may be related to the force applied to the reference mass, and thus to an acceleration of the moving body. Acceleration data may be stored in a memory within the sensor for subsequent processing, or may be transmitted by wire to an external processor. In some applications, accelerometers may be unable to withstand the forces applied to the sensor body without causing damage to the memory within the sensor.

SUMMARY

In general, the invention relates to micro-electro-mechanical systems (MEMS), electronic devices, and sensors. In certain aspects, the invention relates to MEMS shock sensors, particularly MEMS shock sensors having radio frequency identification (RFID) capabilities.

In some cases, it may be desirable to provide a MEMS sensor that is capable of detecting, measuring or registering a high g-force acceleration or deceleration, for example, a shock resulting from an impact, collision, explosion, or the like. Furthermore, it may be desirable to provide a shock sensor that does not require a memory for storing acceleration data, and which is capable of transmitting shock data to a remote receiver. It may also desirable to provide a shock sensor capable of measuring a shock in up to three dimensions of a three-dimensional coordinate system.

In one aspect, the disclosure relates to a shock sensor comprising a substrate and at least one flexure coupled to the substrate and configured to deflect upon an application of force to the shock sensor sufficient to deflect the flexure. Deflection of the at least one flexure produces a detectable change in an electrical property of the shock sensor. Examples of detectable changes in an electrical property of the shock sensor includes an open circuit condition between the flexure and an electrically conductive member (e.g., another flexure or an electrode), a closed circuit condition between the flexure and an electrically conductive member or a detectable change in the electrical property of the shock sensor comprises an open circuit condition.

In another aspect, the disclosure relates to a method comprising exposing a shock sensor to a force, the shock sensor comprising at least one flexure configured to deflect upon an application of a sufficient force to the shock sensor, wherein deflection of the at least one flexure produces a change in an electrical property of the shock sensor and detecting the electrical property of the shock sensor to determine a magnitude of the force.

In one embodiment, the disclosure relates to shock sensors including a multiplicity of electrically conductive, frangible, deflectable flexures arranged in an array on a substrate, and a stationary electrode positioned proximate each of the flexures on the substrate. Each of the flexures may form an electrical circuit with the stationary electrode, and each flexure may exhibit a deflection point, and in some cases, a breaking point, different from at least one other flexure. Each of the flexures may be broken upon application of a force of sufficient magnitude to exceed the breaking point of the flexure, thereby creating an open circuit condition. In some embodiments, the open circuit condition may be remotely read by interrogation of a radio frequency identification transponder positioned on the substrate using a remote radio frequency identification transceiver.

In certain exemplary embodiments, the sensor further includes a multiplicity of electrically conductive, frangible, deflectable flexures arranged in a second array on the substrate, wherein each flexure exhibits a breaking point different from at least one other flexure. In some embodiments, each flexure of the first array may be arranged opposing a flexure of the second array on the substrate. In other embodiments, a second stationary electrode may be positioned proximate each of the flexures on the substrate, each flexure may form an electrical circuit with the second stationary electrode, and each of the flexures may be broken upon application of a second force of sufficient magnitude to exceed the breaking point of the flexure, thereby creating an open circuit condition.

In additional exemplary embodiments, the sensor includes a multiplicity of electrically conductive frangible members. Each frangible member may connect a flexure of the first array to the opposing flexure of the second array, and each frangible member may exhibit a breaking point different from at least one of the flexures that it connects. The frangible member may be broken upon application of a third force of sufficient magnitude to exceed the breaking point of the frangible member, thereby creating an open circuit condition.

In another embodiment, the invention relates to a sensor including a substrate, a deflectable flexure proximate the substrate, a mass positioned in contact with the flexure, and a piezo-electric detector arranged proximate the substrate in contact with the flexure. In certain embodiments, deflection of the flexure by a force external to the sensor produces a detectable variation in voltage from the detector. In certain exemplary embodiments, the sensor includes a resonant circuit that may be activated remotely by a radio frequency transceiver to provide electrical power to the sensor.

In a further embodiment, the invention relates to a shock detection system including providing a shock sensor including a substrate having a radio frequency identification transponder, exposing the shock sensor to an external force, and remotely interrogating the transponder to determine the magnitude of the external force. The shock sensor may be electrically coupled to the transponder, and the transponder may include a resonant circuit that may be activated remotely by a radio frequency transceiver to provide electrical power to the sensor.

In certain exemplary embodiments, the shock sensor may include a multiplicity of electrically conductive, frangible, deflectable flexures arranged in an array on the substrate, a stationary electrode positioned proximate each of the flexures on the substrate, and a remote radio frequency transceiver. Each of the flexures may form an electrical circuit with the stationary electrode, and each flexure may exhibit a breaking point different from at least one other flexure. Each of the flexures may be broken upon application of a force of sufficient magnitude to exceed the breaking point of the flexure, thereby creating an open circuit condition. The transceiver may interrogate the transponder to determine the identity and number of flexures exhibiting open circuit conditions, and thereafter may receive information from the transponder corresponding to a force or acceleration previously applied to the shock sensor.

In an additional embodiment, the invention relates to a method of detecting a shock, including providing a shock sensor having a radio frequency identification transponder communicably coupled to an electrical circuit, exposing the shock sensor to an external force; and remotely interrogating the transponder to determine the magnitude of the external force.

In certain aspects, the invention provides MEMS shock sensors capable of being remotely interrogated to determine acceleration or applied force history. MEMS shock sensors may provide small, low cost devices for detecting, measuring or registering shock history, e.g. maximum force applied to the device, and transmitting that history to a remote receiving device. In some embodiments, the MEMS shock sensor includes a radio frequency identification (RFID) transponder that optionally includes a resonant circuit that may be activated remotely by a radio frequency transceiver to provide electrical power to the sensor. Exemplary applications include shock or acceleration detection and remote communication to control a dedicated function (e.g. shutting down a rocket motor in response to impact with a surface), remotely determining the acceleration or shock history of a sensor using RFID interrogation from a remote transceiver, or calculating the trajectory of an object at a remote location from a measured acceleration history.

Some embodiments of the present invention relate to a MEMS system, electronic device, or sensor fabricated on a single wafer. Certain embodiments of the present invention may thus provide substantial reductions in device size and weight, as well as improvements in manufacturing cost, performance and reliability for MEMS devices. Other embodiments may provide magnetic MEMS sensor that eliminate or reduce the drawbacks of known electronic sensors.

The details of one or more embodiments of the invention are set forth in the accompanying drawings and the description below. Other features, objects, and advantages of the invention will be apparent from the description and drawings, and from the claims.

BRIEF DESCRIPTION OF DRAWINGS

A fuller understanding of the present invention and the features and benefits thereof will be accomplished upon review of the following detailed description together with the accompanying drawings, in which.

DETAILED DESCRIPTION

Various embodiments will be described with respect to the following figures and examples. Other embodiments are within the scope of the claims, and it is understood that the invention is not limited to the specific embodiments described in the following detailed description, but includes these embodiments, as well as all embodiments encompassed by the claimed elements and their equivalents.

Figure 1A:
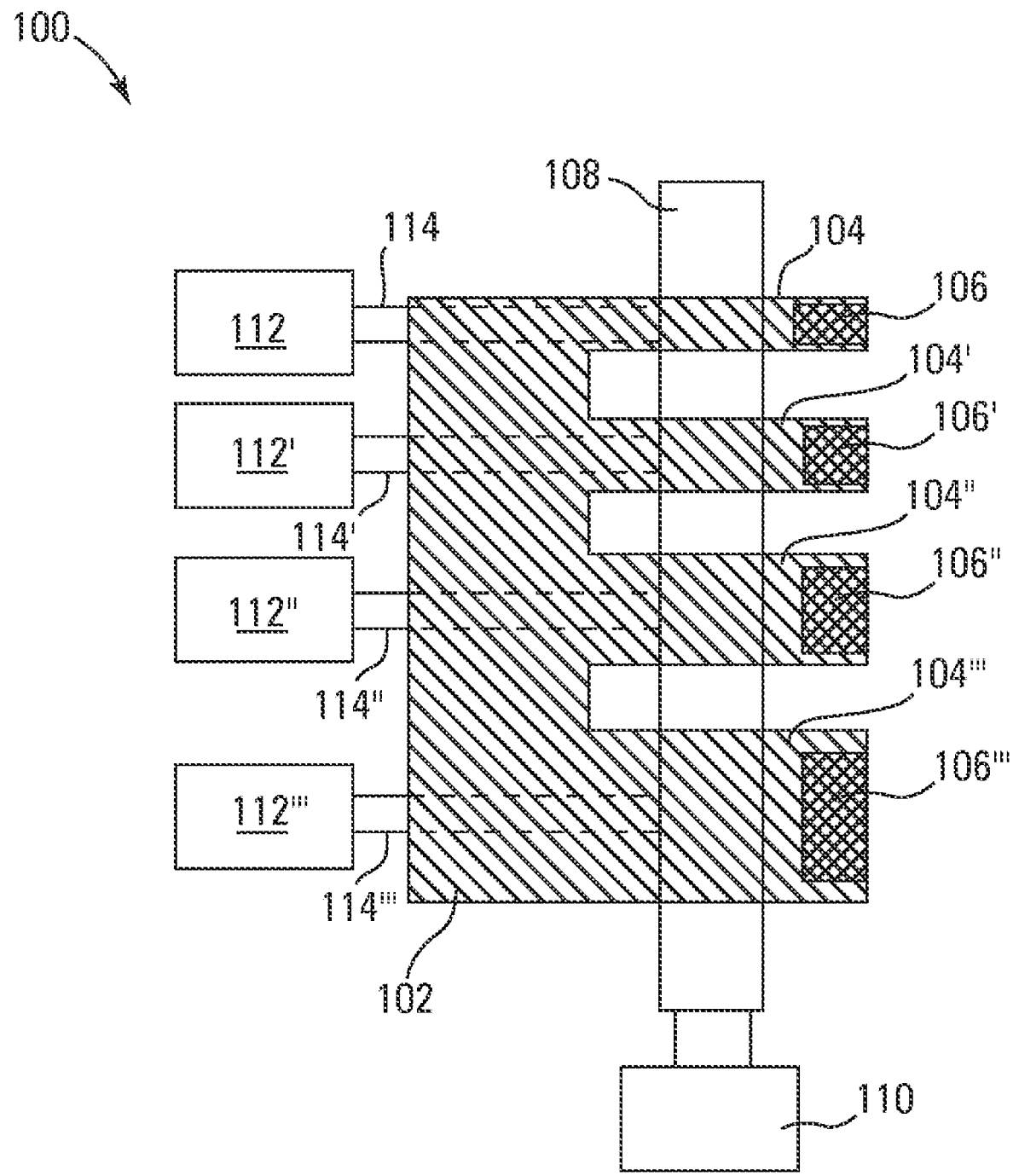
FIG. 1A is a schematic top view diagram illustrating an exemplary MEMS shock sensor according to an embodiment of the present invention.
Figure 1B:
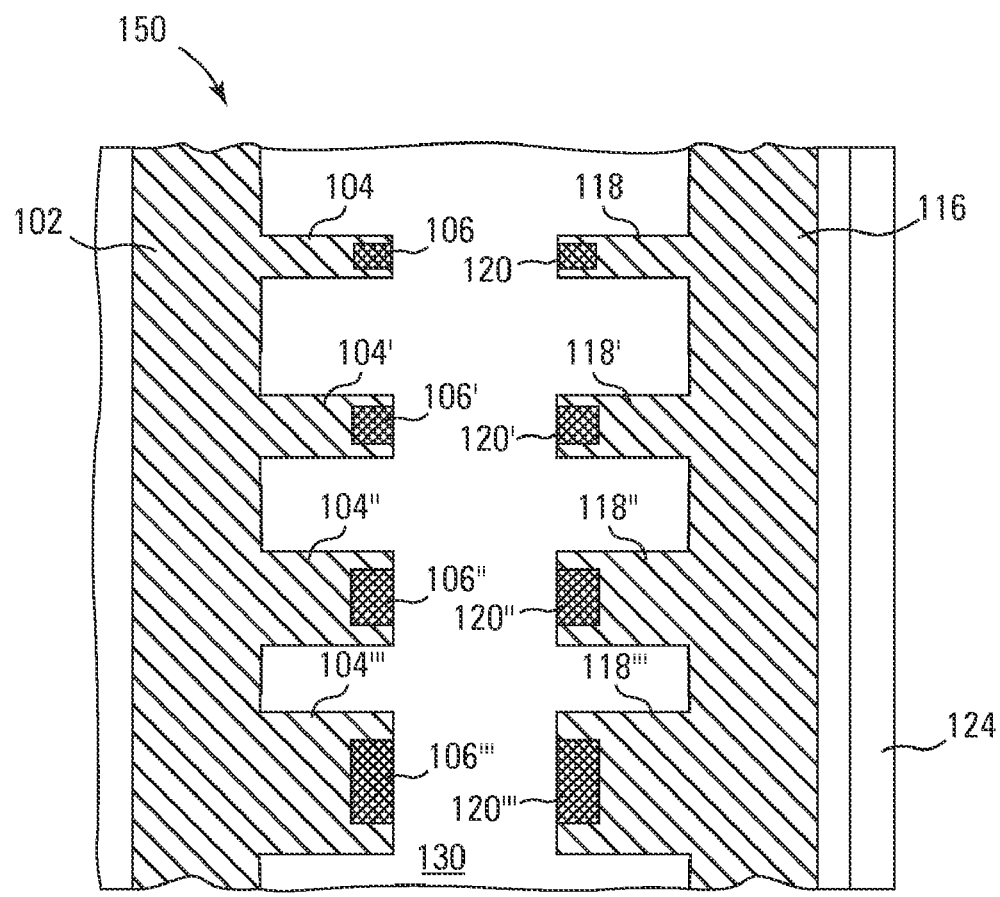
FIG. 1B is a schematic cutaway top view diagram illustrating an exemplary MEMS shock sensor according to another embodiment of the present invention.
Figure 1C:
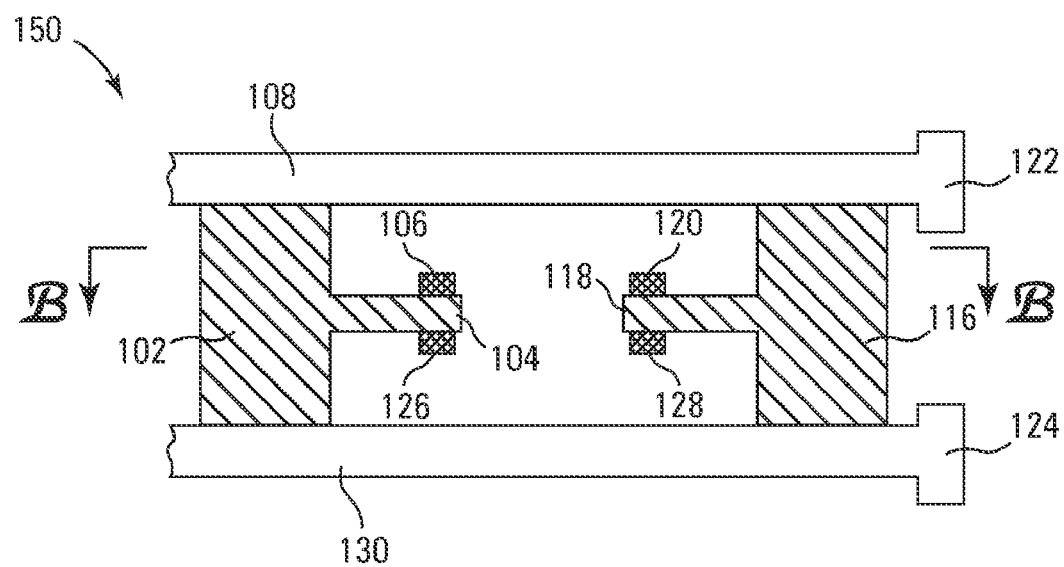
FIG. 1C is a schematic top view diagram illustrating an exemplary MEMS shock sensor according to the embodiment of a MEMS shock sensor illustrated by FIG. 1B.

FIGS. 1A-1C illustrate embodiments of a shock sensor 100 including an array of cantilever flexures 104-104''', and a stationary electrode 108. FIG. 1A is a schematic top view diagram illustrating an array of electrically conductive, frangible, deflectable cantilever flexures 104-104''' extending from and coupled to a substrate 102. A stationary electrode 108 is positioned over the array of cantilever flexures 104-104''', forming an electrode pair between each flexure 104-104''' and the overlapping portions of the stationary electrode 108.

In FIG. 1A, the stationary electrode 108 is shown connected to a radio frequency identification (RFID) transponder 110, which may include a transmitter, an antenna, and an optional resonant circuit (none of which are shown in FIG. 1A) that may be activated by a remote radio frequency transceiver (not shown in FIG. 1A) to provide electrical power to the sensor 100. Each of the flexures 104, 104', 104'' and 104''', may be connected by an electrical circuit 114, 114', 114'' and 114''' to a detector 112, 112', 112'' and 112'''. Each detector 112-112''' is capable of detecting a change in an electrical property of shock sensor 100, where the change is indicative of a magnitude of force applied to shock sensor 100. In the embodiment shown in FIGS. 1A-1C, the change in an electrical property is an open circuit condition of the electrical circuit formed by the electrode pair between each corresponding flexure 104-104''' and the stationary electrode 108. For example, each detector 112-112''' may comprise a control circuit, such as a circuit that detects an electric potential across a resistor. If there is any change in the electric potential, it triggers a signal that can be sent out or registered internally by another electric circuitry.

The open circuit condition for each flexure 104-104''' may be communicated to the radio frequency identification (RFID) transponder 110 using electrical circuitry (not shown in FIG. 1A). An optional mass 106, 106', 106'' and 106''', is shown positioned in contact with each respective flexure 104, 104', 104'' and 104'''. Each mass 106-106''' has a magnitude which may be the same as or different from one or more of the other masses.

The force sufficient to deflect each of the flexures 104-104''' is different for at least two of the flexures 104-104'''. In the embodiment shown in FIGS. 1A-1C, the flexures 104-

104''' each deflects until broken. Accordingly, each of the flexures 104-104''' exhibits a breaking point different from at least one other flexure. Each of the flexures 104-104''' may be broken upon application of a force of sufficient magnitude to exceed the breaking point of the flexure. Breakage of a flexure 104-104''' creates an open circuit condition for the circuit corresponding to that flexure, which may be detected by the corresponding detector 112-112''' and communicated to the RFID transponder 110. The force may, for example, be an externally applied gravitational force, or a force resulting from acceleration or deceleration of the shock sensor.

The breaking point of each flexure may be determined in any number of ways. For example, the breaking point may be determined by selecting different materials for use in the flexures 104-104'''. As one example, different metals having differing material properties that affect the breaking point or deflection point of each flexure, such as different moduli of elasticity, fracture energies, strengths (e.g., compressive, fatigue, impact, and/or tensile strengths), flexural moduli, fracture toughness, impact strengths, shear moduli, or the like, may be used in forming the flexures 104-104'''. In addition or alternatively, each of the flexures may have a cross-section exhibiting a different cross-sectional area. In some embodiments, a flexure exhibiting a larger cross-sectional area may exhibit a higher breaking point than a flexure exhibiting a smaller cross-sectional area, assuming like materials are used to fabricate the flexures.

Upon application of an external force to the shock sensor, one or more of the flexures 104-104''' may be broken, the number of broken flexures depending upon the magnitude of the applied force and the breaking points of the individual flexures 104-104'''. The force sufficient to deflect or break each flexure 104-104''' may be different from at least one other flexure 104-104'''. A broken flexure corresponds to a detectable change in an electrical property of shock sensor 100, in this example, an open circuit condition, that may be detected by the corresponding detector 112-112''' and communicated to the RFID transponder. In particular, because the flexures 104-104''' may have different breaking points (i.e., different forces may be necessary to break flexures 104-104'''), the flexures 104-104''' that break and create the open circuit conditions indicate the force that was applied to sensor 100. By remotely interrogating the RFID transponder 110, a remote radio frequency transmitter and receiver (i.e. a transceiver) may determine, at any given time, the number and identity of open circuits within the shock sensor.

By determining the identity of the highest breaking point flexure exhibiting an open circuit condition, a remote user may determine, at any particular time, the maximum force or acceleration applied to the shock sensor prior to that time. In some embodiments, the breaking point of each flexure 104-104''' is selected to be different from at least one other flexure. In certain embodiments, the breaking point of each flexure 104-104''' can be selected to be different from every other flexure. This may be accomplished, for example, by varying the cross-sectional area of each flexure 104-104''' so that each flexure exhibits a different area, by varying the mass 106-106''' positioned in contact with each flexure 104-104''' so that each mass is different in magnitude, or the like. The array of flexures can be arranged such that the breaking point of each adjacent flexure increases or decreases in moving from one end of the array to the opposite, terminal end of the array within the sensor 100.

FIGS. 1B-C illustrate a second embodiment of a shock sensor 150 on a substrate including a first array 102 of cantilever flexures 104-104''' and a second array 116 of cantilever flexures 118-118'''. A first stationary electrode 108 is positioned over the first array 102 of cantilever flexures 104-104''', forming an electrode pair between each flexure 104-104''' and the overlapping portions of the first stationary electrode 108. A second array 116 of a plurality of electrically conductive, frangible, deflectable flexures 118-118''' is arranged on the substrate as shown in FIG. 1B-C, or may be the same substrate 102 (not shown in FIG. 1B-C).

Each flexure of the first array 102 is arranged opposing a flexure of the second array 116 on the substrate, for example, as illustrated in FIG. 1B-C. A second stationary electrode 130 is positioned under the second array 116 of flexures 118-118''' proximate the substrates 102 and 116, forming an electrode pair between each flexure 108-108''' and the overlapping portions of the second stationary electrode 130.

In FIGS. 1B-C, the first and second stationary electrodes (108 and 130) are shown connected to radio frequency identification (RFID) transponders 122 and 124, which may include a detector for detecting an open circuit condition of one or more of the flexures 104-104''' and 118-118''', respectively; a transmitter, an antenna, and an optional resonant circuit (none of which are shown in FIG. 1B-C) that may be activated by a remote radio frequency transceiver (not shown in FIG. 1B-C) to provide electrical power to the sensor 150.

Each of the flexures 104, 104', 104'' and 104''', may be connected by an electrical circuit (not shown in FIG. 1B-C) to a detector (not shown in FIG. 1B-C). Each detector is capable of detecting an open circuit condition of the electrical circuit formed by the electrode pair between each corresponding flexure 104-104''' and the stationary electrode 108. The open circuit condition for each flexure 104-104''' may be communicated to the radio frequency identification (RFID) transponder 122 using electrical circuitry (not shown in FIG. 1B-C). An optional mass 106, 106', 106'' and 106''', is shown positioned in contact with each respective flexure 104, 104', 104'' and 104'''. Each mass 106-106''' has a magnitude which may be the same as or different from one or more of the other masses.

Each of the flexures 118, 118', 118'' and 118''', may be connected by an electrical circuit (not shown in FIG. 1B-C) to a detector (not shown in FIG. 1B-C). Each detector is capable of detecting an open circuit condition of the electrical circuit formed by the electrode pair between each corresponding flexure 118-118''' and the stationary electrode 130. The open circuit condition for each flexure 118-118''' may be communicated to the radio frequency identification (RFID) transponder 124 using electrical circuitry (not shown in FIG. 1B-C). An optional mass 120, 120', 120'' and 120''', is shown positioned in contact with each respective flexure 118, 118', 118'' and 118'''. Each mass 120-120''' has a magnitude which may be the same as or different from one or more of the other masses.

Each of the flexures 104-104''' and 118-118''' exhibits a breaking point different from at least one other flexure. Each of the flexures 104-104''' and 118-118''' may be broken upon application of a force of sufficient magnitude to exceed the breaking point of the flexure. Breakage of a flexure 104-104''' or 118-118''' creates an open circuit condition for the circuit corresponding to that flexure, which may be detected by the corresponding detector and communicated to the respective RFID transponder 122 or 124. The force may, for example, be an externally applied gravitational force, or a force resulting from acceleration or deceleration of the shock sensor.

The breaking point of each flexure may be determined in any number of ways. For example, the breaking point may be determined by selecting different materials for use in the flexures 104-104''' and 118-118'''. As one example, different metals having differing elasticity, modulus, fracture energy, or the like, may be used in forming the flexures 104-104''' and 118-118'''. The material used to fabricate flexures 104-104''' can be different from the material used to fabricate flexures 118-118'''. In this way, a single shock sensor 150 may be capable of detecting a very wide range of applied force or acceleration.

In addition or alternatively, each of the flexures may have a cross-section exhibiting a different cross-sectional area. In some embodiments, a flexure exhibiting a larger cross-sectional area may exhibit a higher breaking point than a flexure exhibiting a smaller cross-sectional area, assuming like materials are used to fabricate the flexures.

Upon application of an external force to the shock sensor, one or more of the flexures 104-104''' and 118-118''' may be broken, the number of broken flexures depending upon the magnitude of the applied force and the breaking points of the individual flexures 104-104''' and 118-118'''. A broken flexure corresponds to an open circuit condition that may be detected by the corresponding detector and communicated to the corresponding RFID transponder 122 or 124. By remotely interrogating the RFID transponders 122 or 124, a remote radio frequency transmitter and receiver (i.e. a transceiver, not shown in FIG. 1B-C) may determine, at any given time, the number and identity of open circuits within the shock sensor.

By determining the identity of the highest breaking point flexure exhibiting an open circuit condition, a remote user may determine, at any particular time, the maximum force or acceleration applied to the shock sensor prior to that time. In some embodiments, the breaking point of each flexure 104-104''' and 118-118''' is selected to be different from at least one other flexure. In certain embodiments, the breaking point of each flexure 104-104''' and 118-118''' can be selected to be different from every other flexure. This may be accomplished, for example, by varying the cross-sectional area of each flexure 104-104''' and 118-118''' so that each flexure exhibits a different area, by varying the mass 106-106''' or 120-120''' positioned in contact with each flexure 104-104''' or 118-118''' so that each mass is different in magnitude, or the like.

The array of flexures can be arranged such that the breaking point of each adjacent flexure increases or decreases in moving from one end of the array to the opposite, terminal end of the array within the sensor 150.

Figure 2:
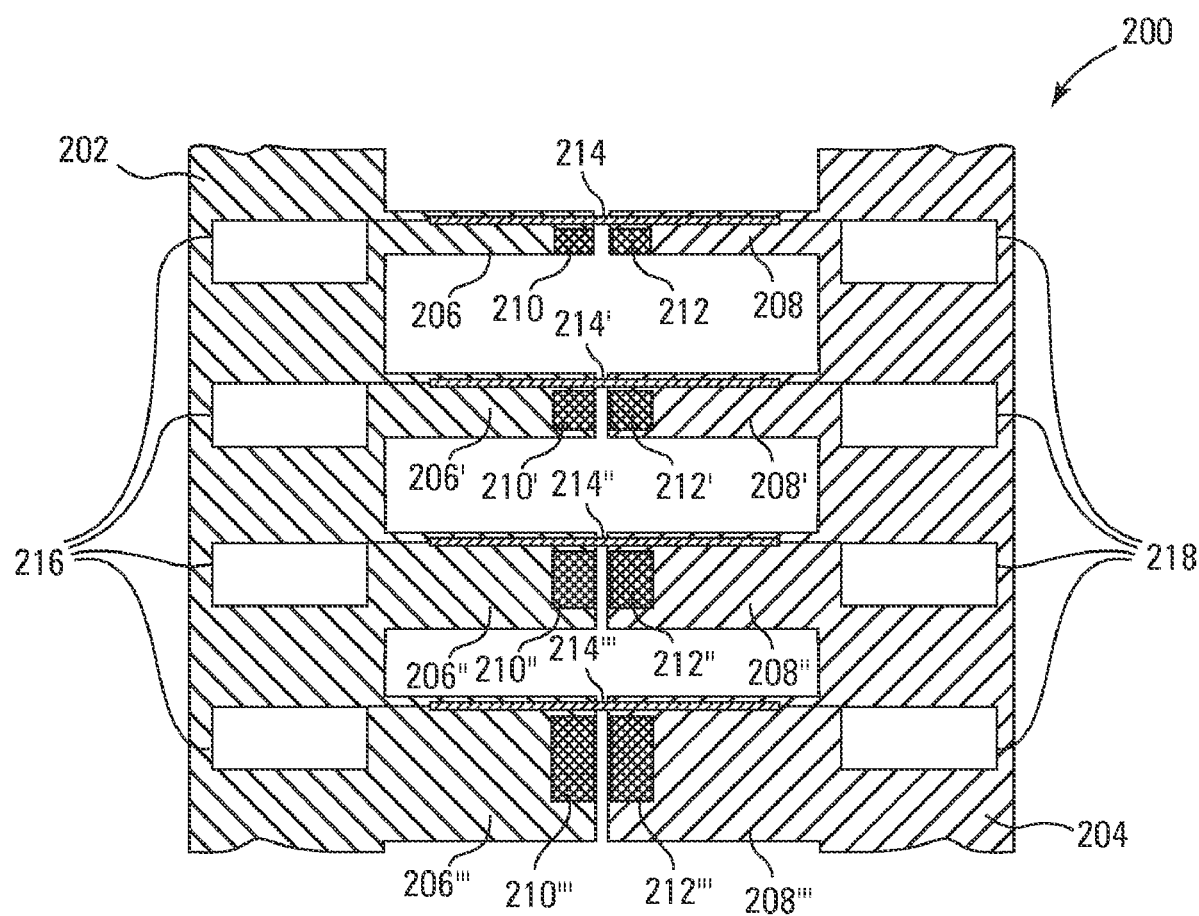
FIG. 2 is a schematic top view diagram illustrating an exemplary MEMS shock sensor according to an additional embodiment of the present invention.

FIG. 2 is a schematic top view diagram illustrating an exemplary MEMS shock sensor 200 according to an additional embodiment. The shock sensor 200 includes a first array 202 of electrically conductive cantilever flexures 206-206''', a second array 204 of electrically conductive cantilever flexures 208-208''', and a multiplicity of electrically conductive frangible members 214-214''', each frangible member 214-214''' electrically connecting a flexure 104-104''' from the first array 202 to a flexure 118-118''' from the second array 204.

Each frangible member 214-214''' may be selected from a film, a filament, a wire, or a web. Each frangible member 214-214''' may exhibit a breaking point different from the flexures that it connects. Each frangible member 214-214''' can exhibit a breaking point less than the breaking point of the corresponding flexure 206-206''' of the first array 202 and the corresponding flexure 208-208''' of the second array 204 that it connects.

Each flexure 206-206''' of the first array 202 is arranged opposing a corresponding flexure 208-208''' of the second array on the substrate, for example, as illustrated in FIG. 2. Each of the flexures 206-206''' and 208-208''' may be electrically connected via an electrical circuit (not shown in FIG. 2) to a detector 216. Upon the application of force to shock sensor 200, each detector is 216 capable of detecting a change in an electrical property of shock sensor 200, where the change is indicative of a magnitude of the force applied to shock sensor 100. In the embodiment shown in FIG. 2 the change in an electrical property is an open circuit condition of the electrical circuit formed by the electrode pair between each corresponding flexure 206-206''' and 208-208'''. The force sufficient to deflect or break each frangible member 214-214''' may be different from at least one other frangible member, and accordingly, the frangible member 214-214''' that breaks and creates the open circuit condition for each flexure 206-206''' and 208-208''' pair indicates the force that was applied to sensor 200. The open circuit condition for each flexure may be communicated to a radio frequency identification (RFID) transponder 218 using electrical circuitry (not shown in FIG. 2). An optional mass 210-210''' or 212-212''' is shown positioned in contact with each respective flexure 206-206''' or 208-208'''. Each mass 210-210''' or 212-212''' has a magnitude which may be the same as or different from one or more of the other masses.

A flexure 206-206''' of the first array 202 exhibits a breaking point less than the corresponding flexure 208-208''' of the second array 204. Each flexure may exhibit a cross-section having a cross-sectional area of selected to be different from a cross-sectional area of at least one other flexure. The cross-sectional area of each flexure can be selected to be different from the cross-sectional area of every other flexure.

Upon application of an external force to the shock sensor, one or more of the flexures 206-206''' and 208-208''' may deflect, thereby breaking the corresponding frangible member 214-214'''. If the applied external force is sufficient, one or more of the flexures 206-206''' and 208-208''' may additionally break. The number of broken frangible members 214-214''' and flexures 206-206''' and 208-208''' depends upon the magnitude of the applied force and the breaking points of the individual frangible members 214-214''' and flexures 206-206''' and 208-208'''.

A broken frangible member 214-214''' or flexure 206-206''' or 208-208''' corresponds to an open circuit condition that may be detected by the corresponding detector 216 and communicated to the corresponding RFID transponder 218. By remotely interrogating the RFID transponders 218, a remote radio frequency transmitter and receiver (i.e. a transceiver, not shown in FIG. 2) may determine, at any given time, the number and identity of open circuits within the shock sensor.

By determining the identity of the highest breaking point frangible member or flexure exhibiting an open circuit condition, a remote user may determine, at any particular time, the maximum force or acceleration applied to the shock sensor prior to that time. In some embodiments, the breaking point of each frangible member 214-214''', flexure 206-206''' and flexure 208-208''' is selected to be different from at least one other frangible member or flexure. In certain embodiments, the breaking point of each flexure 206-206''' and 208-208''' can be selected to be different from every other flexure. This may be accomplished, for example, by varying the cross-sectional area of each flexure 206-206''' and 208-208''' so that each flexure exhibits a different area, by varying the mass 210-210''' or 208-208''' positioned in contact with each flexure 206-206''' and 208-208''' so that each mass is different in magnitude, or the like.

The frangible members can exhibit breaking points so that each adjacent frangible member exhibits a breaking point that increases or decreases in moving from one end of the array to the opposite, terminal end of the array within the sensor 200. The array of flexures can be arranged such that the breaking point of each adjacent flexure increases or decreases in moving from one end of the array to the opposite, terminal end of the array within the sensor 200.

Figure 3:
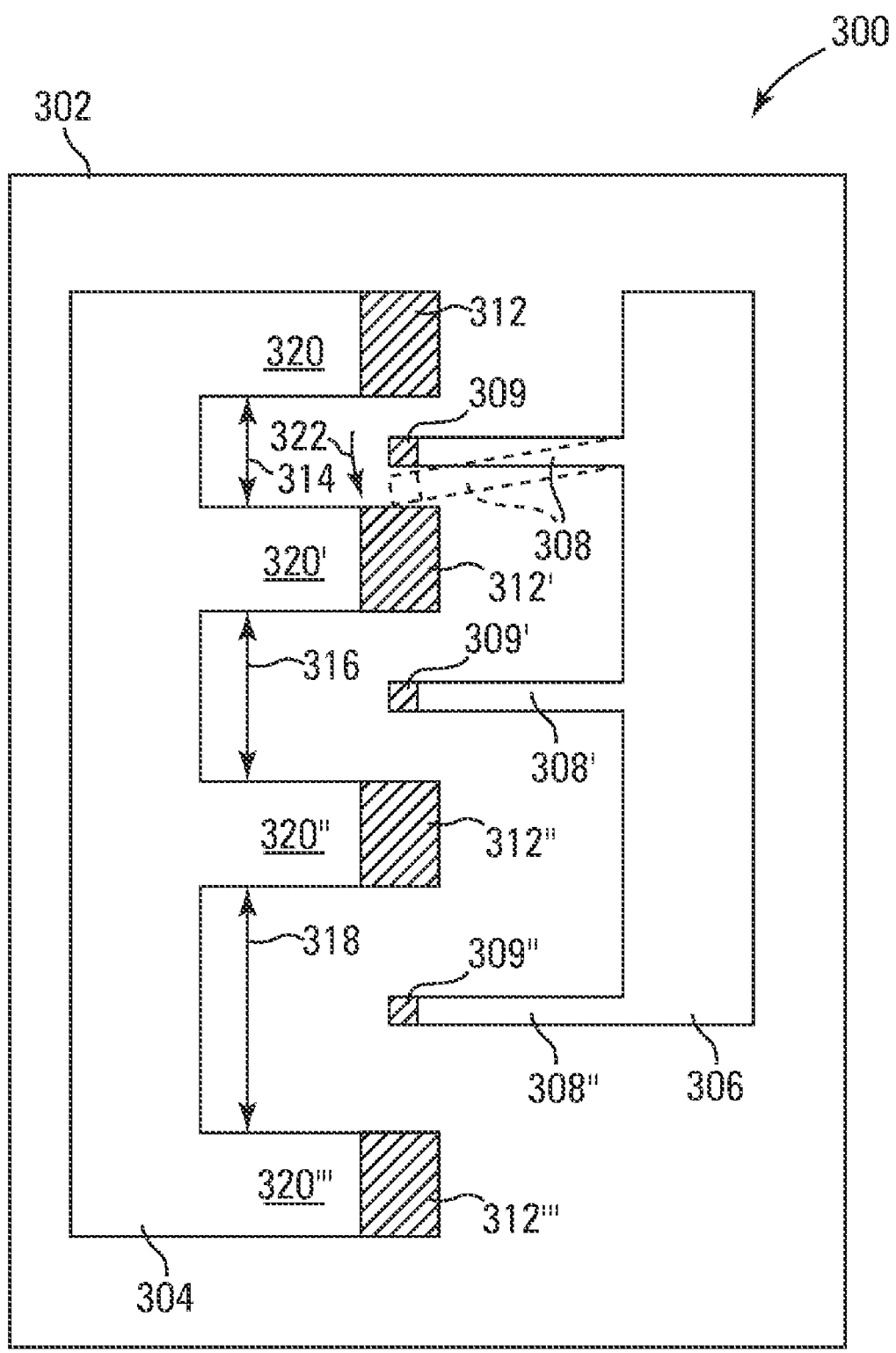
FIG. 3 is a schematic top view diagram illustrating an exemplary MEMS shock sensor according to yet another embodiment of the present invention.

FIG. 3 is a schematic top view diagram illustrating an exemplary MEMS shock sensor 300 according to yet another embodiment. The shock sensor 300 includes substrate 302 having formed thereon a first array 304 of electrically conductive cantilever flexures 320-320''' arranged opposing a second array 306 of electrically conductive cantilever flexures 308-308'''. Each flexure 320-320''' of the first array 304 defines a space between each adjacent flexure within the first array. Each space defines a distance 314, 316 or 318 separating adjacent flexures 320-320''' within the first array 304. Each distance may differ in magnitude from each other distance separating adjacent flexures 320-320''' within the first array 304, as illustrated by FIG. 3. The distance between a first pair of adjacent flexures within the first array 304 (for example, the distance 314 between adjacent flexures 320 and 320') can be less than the distance between a second pair of adjacent flexures within the first array 304 (for example, the distance 316 between adjacent flexures 320' and 320'').

In certain embodiments, each flexure 308-308''' of the second array 306 may include a permanent magnet 309-309''' positioned in contact with the respective flexure 308-308'''. Application of a force less than the breaking point of at least a first flexure (for example, flexure 308) within the second array 306 can cause deflection of the first flexure (for example, 308 shown in dashed lines) sufficient to make contact with a second flexure (for example, flexure 320') within the first array 304 positioned opposite to and adjacent with the first flexure (e.g. flexure 308), thereby magnetically latching the flexure 308 to the flexure 320' to complete an electrical circuit.

In this embodiment, flexures 320-320''' may include one or more permanent magnets 312-312''' as shown in FIG. 3, provided opposite magnetic poles of the permanent magnets 309-309''' and corresponding permanent magnets 312-312''' are aligned to permit magnetic latching. Alternatively, flexures 320, 320', 320'' or 320''' may comprise a material, such as iron or steel, which may attract and latch permanent magnets 312, 312', 312'' or 312'''.

In an alternative embodiment, one or more of flexures 320-320''' may include a permanent magnet 312-312''' positioned in contact with the respective flexure 320-320'''. Application of a force less than the breaking point of at least a first flexure (for example, flexure 308) within the second array 306 can cause deflection of the first flexure (for example, 308 shown in dashed lines) sufficient to make contact with a second flexure (for example, flexure 320') within the first array 304 positioned opposite to and adjacent with the first flexure (e.g. flexure 308), thereby magnetically latching the flexure 308 to the flexure 320' by magnetic coupling of permanent magnet 312' and permanent magnet material 309 to complete an electrical circuit.

In this alternative embodiment, flexures 308-308''' may include a permanent magnet material 309-309''' as shown in FIG. 3, provided opposite magnetic poles of the permanent magnets 309, 309', 309'' and 309''' are aligned with opposite magnetic poles of permanent magnets 312, 312', 312'' or 312''' to permit magnetic latching. Alternatively, flexures 308-308''' may comprise a material, such as iron or steel, that may be attracted to and latched by permanent magnets 312, 312', 312'' or 312''', without requiring the need to align opposite magnetic polarities.

A detector (not shown in FIG. 3) may detect a change in an electrical property of shock sensor 300, where the change is indicative of a magnitude of force applied to shock sensor 300. In the embodiment shown in FIG. 3 the change in an electrical property is a closed (i.e. completed) electrical circuit. The detector is capable of detecting a closed circuit condition of the electrical circuit formed between each opposing flexure of the first array 304 and the second array 306. The closed circuit condition for each flexure 320-320''' may be communicated to a radio frequency identification (RFID) transponder (not shown in FIG. 3) using electrical circuitry (not shown in FIG. 3). An optional permanent magnet material 312-312''' is shown positioned in contact with each respective flexure 320', 320'. 320'' and 320'''. Each permanent magnet 309-309''' may also function as a mass connected to the corresponding flexure 309-309'''. Each mass may have a magnitude which may be the same as or different from one or more of the other masses.

Because the flexures 308-308''' do not break to complete the electrical circuit and cause a detectable closed circuit condition, MEMS shock sensor 300 may be reusable. For example, after a force is applied to MEMS shock sensor 300, causing one or more of flexures to magnetically latch to a respective flexure 320-320''', and the closed circuit is detected, the flexures 308-308''' that are contacting the respective flexures 320-320''' may be unlatched from the respective flexure 320-320''' by demagnetizing the permanent magnets 309-309''' of flexures 308-308''' and permanent magnets 312-312''' of flexures 320-320''' to unlatch the flexures 308-308''' and 320-320'''. The permanent magnets 309-309''' and 312-312''' may then be reoriented in a strong magnetic field to condition MEMS shock sensor 300 for reuse.

Figure 4:
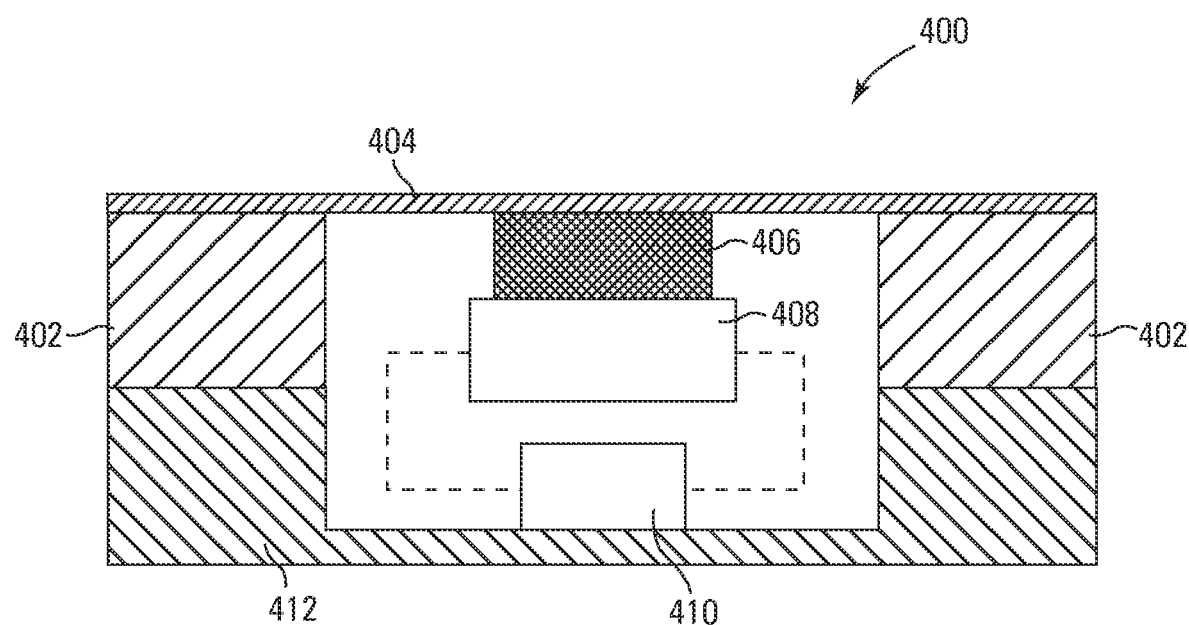
FIG. 4 is a schematic top view diagram illustrating an exemplary MEMS shock sensor according to a further embodiment of the present invention.

FIG. 4 is a schematic top view diagram illustrating an exemplary MEMS shock sensor 400 according to a further embodiment. The sensor 400 includes a substrate 402, a deflectable beam flexure 404 proximate the substrate 402, a mass 406 positioned in contact with the flexure 404, and a piezo-electric detector 408 arranged proximate the substrate 402 joined to the flexure 404. Although mass 406 and piezo-electric detector 408 are shown in FIG. 4 as abutting one another, in other embodiments, mass 406 and piezo-electric detector 408 may be separated by a gap or may otherwise be separated from each other. In the embodiment of sensor 400 shown in FIG. 4, deflection of the flexure 404 by a force external to the sensor 400 sufficient to deflect flexure 404 produces a detectable change in an electrical property of shock sensor 400, where the change is indicative of a magnitude of force applied to shock sensor 400. In the embodiment shown in FIG. 4, the change in an electrical property is a variation in voltage from the detector 408. The variation in voltage is proportional to the magnitude of the external force.

A radio frequency identification (RFID) transponder 410 may be positioned on substrate 402 (not illustrated by FIG. 4), or, as illustrated by FIG. 4, RFID transponder 410 may be formed on another substrate 412 that may be joined to substrate 402 to form a packaged sensor. The packaged sensor can be hermetically sealed. RFID transponder 410 is in communication with detector 408, for example, using an electrical connection as shown in FIG. 4. RFID transponder 410 may receive from detector 408 an electrical signal proportional to the magnitude of the external force. By remotely interrogating the RFID transponder 410, a remote radio frequency transmitter and receiver (i.e. a transceiver, not shown in FIG. 4) may determine, at any given time, the magnitude of the force presently applied to the sensor 400.

In some embodiments, RFID transponder 410 may also include a resonant circuit (not shown in FIG. 4) that may be activated remotely by a radio frequency transceiver (not shown in FIG. 4) to provide electrical power to the sensor.

Another embodiment comprises a shock detection system, including a shock sensor electrically coupled to a radiofrequency identification transponder, and a remote radio frequency transceiver. The transceiver interrogates the transponder to determine the magnitude of a force or acceleration previously applied to the shock sensor. The shock sensor may include any of the sensors described in FIGS. 1-4, as well as sensors within the scope of the claim elements and their equivalents.

Another embodiment comprises a shock detection method, including providing a shock sensor comprising a radio frequency identification transponder communicably coupled to an electrical circuit, exposing the shock sensor to an external force, and remotely interrogating the RFID transponder to determine the magnitude of the external force. The magnitude of the external force may be determined by identifying the number of flexures exhibiting open circuit conditions (e.g., in accordance with the embodiments of shock sensors shown in FIG. 1 or 2), the number of flexures completing an electrical circuit (e.g., in accordance with the embodiment of a shock sensor shown in FIG. 3), or a voltage change in a detector (e.g., in accordance with the embodiment of a shock sensor shown in FIG. 4).

Various methods are known in the art for fabricating MEMS devices and radiofrequency identification transponders, antenna and resonant circuits on a substrate, for example, an integrated circuit die. Suitable MEMS fabrication methods are described in U.S. patent application Ser. No. 11/348,930, entitled "MAGNETIC MEMS DEVICE" and filed on Feb. 7, 2006, the entire contents of which is incorporated herein by reference. Suitable RFID circuit fabrication methods are described in pending U.S. Pat. Pub. No. 2006/0009251 A1, titled "RF DEVICE ON INSULATING SUBSTRATE AND METHOD OF MANUFACTURING RF DEVICE," published Jan. 12, 2006, the entire contents of which are incorporated herein by reference.

The RFID MEMS sensor may be fabricated onto a single semiconductor integrated circuit die, or it may be comprised of a plurality of semiconductor dice in a single integrated circuit package. It is also contemplated and within the scope of the invention that multi-device RFID sensors incorporating a plurality of discrete electronic devices, including but not limited to, microcontrollers, memories, digital logic circuits, analog circuits, and discrete and/or monolithic transducer/sensors, may be fabricated into any of the aforementioned embodiments.

The present invention is not limited to the previously described embodiments. Thus, it is possible to make a variety of modifications and changes within the scope of the technological disclosure and claims of the present invention, and these modifications and changes are equivalent to the present invention.

Various embodiments of the invention have been described. These and other embodiments are within the scope of the following claims.

The invention claimed is:

1. A shock sensor comprising:
   a substrate;
   at least one flexure coupled to the substrate and configured to deflect upon an application of sufficient force to the shock sensor, wherein deflection of the at least one flexure produces a detectable change in an electrical property of the shock sensor, wherein the deflection of the at least one flexure persists upon termination of the application of the sufficient force, and wherein the detectable change in the electrical property of the shock sensor comprises an open circuit condition; and
   a radio frequency identification (RFID) transponder configured to transmit data identifying a number of flexures producing the detectable change in the electrical property from the RFID transponder to a remote device.

2. The shock sensor of claim 1, further comprising an electrically conductive member, wherein the at least one flexure comprises a plurality of electrically conductive flexures configured to electrically connect to the electrically conductive member and the force sufficient to deflect is different for at least two of the flexures.

3. The shock sensor of claim 2, wherein each flexure comprises a mass member having a mass, wherein the mass differs for at least two of the flexures.

4. The shock sensor of claim 2, wherein the force is sufficient to break the flexures, wherein the force sufficient to break is different for each flexure.

5. The shock sensor of claim 2, wherein the electrically conductive member comprises a stationary electrode electrically connected to each flexure, such that upon the application of force to the shock sensor, one or more of the flexures electrically disconnect from the stationary electrode to produce the open circuit condition.

6. The shock sensor of claim 5, wherein the flexures collectively comprise a first set of flexures, the shock sensor further comprising a second set of electrically conductive flexures, wherein the electrically conductive member comprises a first stationary electrode and a second stationary electrode, the first set of flexures being electrically connected to the first stationary electrode and the second set of flexures being electrically connected to the second stationary electrode.

7. The shock sensor of claim 2, wherein the flexures collectively comprise a first set of flexures and the electrically conductive member comprises a second set of electrically conductive flexures each electrically coupled to at least one flexure of the first set, wherein each flexure of the first set is configured to electrically disconnect from the respective flexures of the second set upon the application of force sufficient to deflect the flexure.

8. The shock sensor of claim 7, further comprising at least two frangible members, each frangible member electrically connecting a flexure of the first set to a flexure of the second set, wherein each frangible member is configured to break upon the application of force to the shock sensor, wherein the force sufficient to break each frangible member is different for at least two of the frangible members.

9. The shock sensor of claim 2, wherein a cross-sectional area of a cross-section of each flexure is different than at least one other flexure.

10. The shock sensor of claim 1, further comprising a detector to detect the change in the electrical property of the shock sensor, wherein the detector comprises a control circuit.

11. The shock sensor of claim 1, further comprising a resonant circuit configured to be activated remotely by a radio frequency transceiver to provide electrical power to the shock sensor.

12. The shock sensor of claim 1, wherein the deflection comprises a break in the at least one flexure.

13. The shock sensor of claim 1, wherein the deflection is permanent.

14. The shock sensor of claim 1, wherein the open circuit condition comprises an absence of an electrical connection between the at least one flexure and a stationary electrode.

15. A shock sensor comprising:
   an electrically conductive member;
   at least two electrically conductive flexures configured to electrically connect to the electrically conductive member;

a detector; and a radio frequency identification (RFID) transponder coupled to the detector, wherein each flexure is configured to produce an open circuit condition upon an application of sufficient force to the shock sensor, the force being sufficient to deflect at least one of the flexures and the force sufficient to deflect each one of the at least two flexures being different, wherein the deflection persists for at least one of the at least two flexures upon termination of the application of the sufficient force, and wherein the detector is configured to detect the open circuit condition and communicate the open circuit condition to the RFID transponder.

16. A method comprising:

exposing a shock sensor to a force, the shock sensor comprising at least one flexure configured to deflect upon an application of a sufficient force to the shock sensor, wherein the deflection of the at least one flexure produces a detectable change in an electrical property of the shock sensor, wherein the deflection persists upon termination of the application of the sufficient force, and wherein the detectable change in the electrical property of the shock sensor comprises an open circuit condition; and detecting the electrical property of the shock sensor to determine a magnitude of the force, wherein detecting the electrical property of the shock sensor comprises interrogating a radio frequency identification (RFID) transponder.

17. The method of claim 16, wherein the shock sensor comprises an electrically conductive member and at least two electrically conductive flexures configured to electrically connect to the electrically conductive member, wherein each flexure is configured to electrically disconnect from the electrically conductive member upon the application of the sufficient force to the shock sensor, wherein the sufficient force to deflect is different for at least two of the flexures, wherein the open circuit condition comprises an open circuit condition between the electrically conductive member and at least one of the flexures, and wherein detecting the electrical property of the shock sensor comprises detecting the open circuit condition between the electrically conductive member and at least one of the flexures.

18. The method of claim 16, wherein the deflection comprises a break in the at least one flexure.

19. The method of claim 16, wherein the deflection is permanent.

20. A shock sensor comprising:

a substrate;

a plurality of flexures coupled to the substrate and configured to break upon an application of sufficient force to the shock sensor, wherein the force sufficient to break is different for at least two flexures of the plurality of flexures, and wherein breakage of at least one flexure of the plurality of flexures produces a detectable change in an electrical property of the shock sensor; and a radio frequency identification (RFID) transponder configured to transmit data identifying a number of flexures producing the detectable change in the electrical property to a remote device.

21. The shock sensor of claim 20, wherein the detectable change in the electrical property of the shock sensor comprises an open circuit condition.

22. The shock sensor of claim 21, wherein the open circuit condition comprises an absence of an electrical connection between the at least one flexure and a stationary electrode.

23. A shock sensor comprising:

a substrate;

at least one flexure coupled to the substrate and configured to deflect upon an application of sufficient force to the shock sensor, wherein deflection of the at least one flexure produces a detectable change in an electrical property of the shock sensor, wherein the deflection of the at least one flexure persists upon termination of the application of the sufficient force, and wherein the detectable change in the electrical property of the shock sensor comprises an open circuit condition; and a resonant circuit configured to be activated remotely by a radio frequency transceiver to provide electrical power to the shock sensor.

24. A method comprising:

remotely providing electrical power to a shock sensor with a radio frequency transceiver;

exposing the shock sensor to a force, the shock sensor comprising at least one flexure configured to deflect upon an application of a sufficient force to the shock sensor, wherein the deflection of the at least one flexure produces a detectable change in an electrical property of the shock sensor, wherein the deflection persists upon termination of the application of the sufficient force, and wherein the detectable change in the electrical property of the shock sensor comprises an open circuit condition; and detecting the electrical property of the shock sensor to determine a magnitude of the force.

* * * * *